United States Patent [19]
Dockser

[11] Patent Number: 5,481,686
[45] Date of Patent: Jan. 2, 1996

[54] FLOATING-POINT PROCESSOR WITH APPARENT-PRECISION BASED SELECTION OF EXECUTION-PRECISION

[75] Inventor: Kenneth A. Dockser, San Jose, Calif.

[73] Assignee: VLSI Technology, Inc., San Jose, Calif.

[21] Appl. No.: 433,829

[22] Filed: May 4, 1995

Related U.S. Application Data

[63] Continuation of Ser. No. 241,108, May 11, 1994, abandoned.
[51] Int. Cl.$^6$ ..................................... G06F 9/302
[52] U.S. Cl. ............... 395/375; 364/937.1; 364/258.0
[58] Field of Search ................................ 395/375, 800; 364/748

[56] References Cited

U.S. PATENT DOCUMENTS

| | | | |
|---|---|---|---|
| 4,484,259 | 11/1984 | Palmer | 364/754 |
| 5,027,272 | 6/1991 | Samuels | 395/375 |

OTHER PUBLICATIONS

"IEEE Standard for Binary Floating–Point Arithmetic," ANSI/IEEE Std 754–1985, published by the Institute of Electrical and Electronics Engineers, Inc., N.Y. 1985

Primary Examiner—David Y. Eng
Attorney, Agent, or Firm—Clifton L. Anderson

[57] ABSTRACT

A floating-point processor comprises an input format converter, operand registers, a mode selector, an execution unit, and a result format converter. Inputs to the processor include first and second source values, low and high order result precision selectors, and an operation selector. The input format converter converts the source values to extended precision operands for storage in the registers. The mode selector is responsive to the apparent precisions, i.e., the numbers of trailing zeroes in the mantissas, of the operands as well as to the requested precision. The maximum of the requested result precision and the apparent precision determines the precision implemented by the execution unit. The results are stored in extended precision regardless of the execution precision. If the requested precision is less than extended, the result format converter converts the result to the requested format.

7 Claims, 2 Drawing Sheets

FLOATING-POINT PROCESSOR WITH APPARENT-PRECISION BASED SELECTION OF EXECUTION-PRECISION

This is a continuing application of U.S. patent application Ser. No. 08/241,108, filed May 11, 1994, now abandoned.

BACKGROUND OF THE INVENTION

The present invention relates to floating-point processing and, more particularly, floating-point processors with selectable precision modes. A major objective of the present invention is to reduce floating-point latencies, and thus increase processing throughput.

Floating-point processors are specialized computing units that perform certain arithmetic operations, e.g., multiplication, division, trigonometric functions, and exponential functions, at high speeds. Accordingly, high-power computing systems often incorporate floating-point processors, either as part of a main processor or as a coprocessor.

"Floating-point" describes a class of formats for expressing numbers. A typical floating-point format describes a number by identifying its sign, its exponent and its mantissa. For example, 100/3 equals $33.\overline{3}$. This number can be approximated in floating-point format as $(+)(10^2)(0.333)$. However, it can be more precisely expressed as $(+)(10^2)(0.333333)$. To calculate $(100/3)^2 = 1111.\overline{1} = (+)(10^4)(0.\overline{1})$ using the lower precision floating-point format, one would get $(+)(10^4)(0.110889)$. Only the first three digits are considered significant, so the result would be rounded and expressed as $(+)(10^4)(0.111)$. Using the higher precision format, one would get $(+)(10^4)(0.111110888889)$. Rounding this to six significant figures results in $(+)(10^4)(0.111111)$. Note that the latter answer is more accurate, but requires more time to calculate. The time between the start of the operation and the obtaining of the result is referred to herein as "latency".

Floating-point processors express numbers in binary form (with strings of 1s and 0s) instead of decimal form, but the tradeoff between precision and computation time and effort remains. Accordingly, many floating-point processors have computational modes that differ in the target precision.

Three precisions, taken from the ANSI/IEEE standard 754-1985, are commonly employed: "single" 32-bit precision provides for a 1-bit sign, an 8-bit exponent, and a 24-bit mantissa; "double" 64-bit precision provides for a 1-bit sign, an 11-bit exponent, and a 53-bit mantissa; and "extended double" or "extended" 80-bit precision provides for a 1-bit sign, a 15-bit exponent, and a 64-bit mantissa. In the case of IEEE single and double precision, the most significant mantissa bit is not stored in the encoding, but is implied to be "0" or "1" based on the exponent. When precision is of the utmost concern, extended precision operands and results are employed; when precision is less critical and latency is important, single precision is employed. Double precision provides for intermediate latency and precision.

The challenge for multiple-precision floating point processors is to ensure that the operand (source) precisions are the same as each other and are greater than or equal to the requested result precision. Operands of greater precision than the result precision determine the precision with which the operations must be performed. The result must then be rounded to the specified result precision. Operands of lesser precision than other operands or the result precision must be converted to the largest of these precisions.

Some floating-point processors require programmers to track the precision of all data. Where necessary, format conversion instructions are included so that operand precisions are at least as great as the result precision, and so the result can be rounded to the specified format. This approach places a substantial burden on the programmer and requires additional code to be processed, increasing latency.

More modern floating-point processors provide for implicit format conversion. The processor looks at the specified precision of the operands and compares it to the requested result precision. The operand precisions are converted as necessary to correspond to the larger of the specified and requested result precisions. This removes the need for additional code instructions. However, the burden of tracking precisions is still on the programmer.

The burdens of tracking are avoided by performing all operations at the highest available precision. The results can then be rounded to the requested precision. Operands originally formatted at a lower precision can be converted to the highest available precision. However, this approach has severely wasteful latencies when lower precision results are called for.

Floating-point operations generally involve large numbers of iterations for each operation. In addition, many programs require large numbers of floating-point operations. Processing throughput is thus strongly affected by floating-point latencies. What is needed is a multi-precision floating-point system that helps minimize these latencies, while avoiding burdens on programmers and program code.

SUMMARY OF THE INVENTION

The present invention provides a floating-point processor comprising an instruction input, one or more operand registers, a mode selector, and an execution unit. In addition, the processor can include input and result format converters. The precision with which the execution unit performs an operation is determined by the mode selector. The mode selector selects the execution precision to be equal to the maximum of: 1) the requested result precision, and 2) the maximum apparent precision of the one or more operands.

"Apparent precision" is distinguished from "nominal precision" as follows. The nominal precision of a number is basically the precision specified by the programmer. The "apparent precision" of a number is the lowest precision, of a given set of precisions, in which the number can be expressed without error. Assuming a set of precisions consisting of extended, double, and single precisions, the apparent precision of "1" specified to be in extended precision is single, while the nominal precision is extended. On the other hand, if the precision with which "precision" is measured is bit level, then the apparent precision of "1" is one bit.

Apparent precision can be measured by examining the mantissa only or by examining both the mantissa and the exponent. When the latter approach is used, there are some numbers with large exponents that cannot be expressed in the format associated with their apparent precisions. Surprisingly, these anomalies favor the mantissa-only approach to evaluating apparent precision. In some cases, operations cancel large exponents of higher (e.g., extended) precision format numbers to yield an exponent expressible in a lower (e.g., single) precision format. In such cases, considerable latency can be saved by executing the operation in single precision rather than extended precision. Of course, the exponent is not reformatted to a lower precision as the operation is executed. Cases in which the result exponent cannot be expressed in a lower precision yield errors that cannot be avoided given the requested result precision.

In a preferred realization of the invention, the inputs to the processor include first and second source values, an indication of whether a multiply or divide operation is called for, and an indication of whether the result is to be expressed in single, double, or extended precision. The source values can be expressed in single, double, or extended precision. The input format converter converts single or double precision source values to extended precision format, but leaves extended precision source values in extended format. Thus, the resulting operands stored in respective registers are in extended precision format.

The registers and thus the operands stored therein are formatted to have a one-bit sign section, a 15-bit exponent section, and a 64-bit mantissa section. The mantissa section can be considered as included "single", "double", and "extended" precision subsections. These labels refer to the use of the subsections in determining apparent precision. The single subsection comprises the 24 most significant bits of the mantissa; if all the mantissa bits outside the single subsection are zero, then the apparent precision is single. The double subsection comprises the 25th through 53rd significant bits; if at least one of these bits is a one and all bits of the extended subsection are zero, then the apparent precision is double. The extended subsection comprises the 54th through the 64th most significant bits; these are also the eleven least significant bits. If any of the bits in the extended subsection are one, then the apparent precision is extended.

The mode selector in effect scans the mantissa subsections so that an execution precision can be selected as a function of the apparent precisions of the operands. While the invention provides for explicit determination of apparent precision, such a determination is not essential. The mode selector preferably directly determines the maximum precision between: the requested result precision and the maximum apparent operand precision. Alternatively, each mantissa can be scanned to determined its apparent precision. The determined apparent precisions can be represented in respective flag registers. The contents of the flag registers can then be compared with the requested result precision to determine execution precision.

The execution unit performs the operation at the execution precision determined by the mode selector. The mantissas of the operands are effectively truncated to correspond to the execution precision. It is the truncation of the mantissa that reduces latencies. The exponents need not be converted because there is little latency to be gained by operating on a single precision exponent instead of an extended precision exponent. Any gain would be offset by the loss of savings in the anomalous cases mentioned above. The result of the execution of the operation is preferably in extended precision format, with up to three additional bits (e.g., guard, round, and sticky), for rounding.

The result format converter converts the execution result to the requested result precision. Note that if the exponent of the execution result is too large to be expressed in the requested result precision, an error condition must be flagged. However, this error condition would occur even if the operation were performed at extended precision.

The present invention allows some operations to be performed at less than maximum precision without burdening the programmer with precision tracking or the program code with additional instructions. This latter is particularly important because it permits the present invention to be employed as an upgrade to existing floating-point processors.

Moreover, the present invention reduces latencies in many cases not addressed by implicit format conversion. For example, consider multiplying 2×2 where a single-precision result is requested, but where at least one operand is specified in extended precision. Implicit format conversion would require the 67 iterative additions associated with extended-precision multiplication, while the present invention would require only the 27 associated with single-precision multiplication. These and other features and advantages of the present invention are apparent from the description below with reference to the following drawings.

DESCRIPTION OF THE PREFERRED EMBODIMENTS

Figure 1:
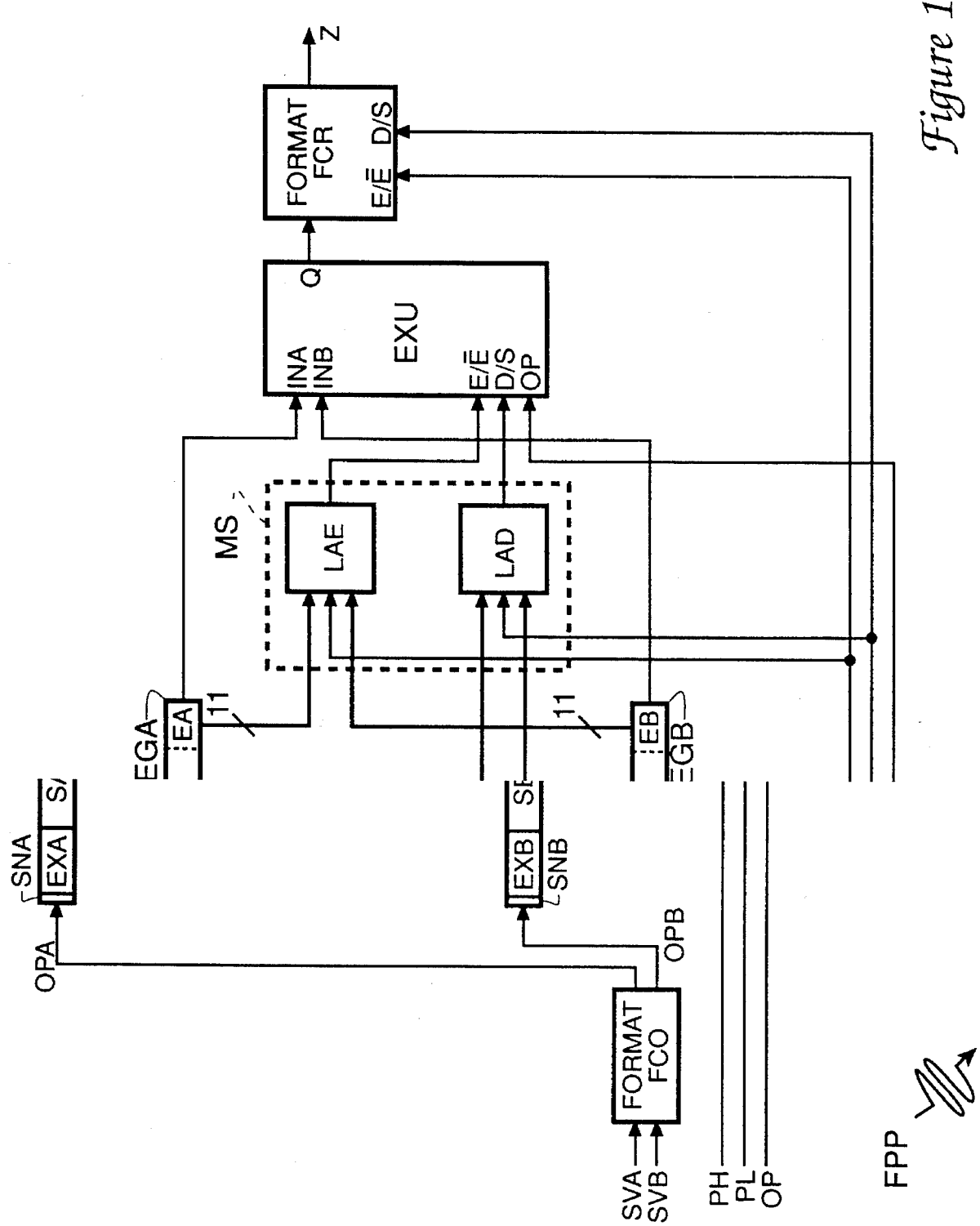
FIG. 1 is a schematic diagram of a floating-point processor in accordance with the present invention.

A floating-point processor FPP comprises an operand format converter FCO, registers REGA and REGB, a mode selector MS, an execution unit EXU, and a result format converter FCR, as shown in FIG. 1. Inputs to processor FPP include a first source value SVA, a second source value SVB, a high-order precision selection line PH, a low-order precision selection line PL, and an operation selection line OP. The output of processor FPP is a result Z.

Source values SVA and SVB are floating-point numbers that can be expressed in any of three floating-point precision formats: single precision, double precision, and extended precision. Operand format converter FCO converts source values not in extended-precision format to extended-precision format by adjusting the exponent and appending trailing zeroes to the mantissa. Source values originally in extended precision are left in that format. Operand format converter FCO thus provides two operands OPA and OPB in extended-precision format to respective registers REGA and REGB.

Register REGA is designed to store a binary extended-precision floating-point number. Accordingly, register REGA has a 1-bit sign section SNA, a 15-bit exponent section EXA, and a 64-bit mantissa section MNA. Mantissa section MNA includes three subsections: a 24-bit "single-precision" subsection SA consisting of the 24 most significant mantissa bits, a 29-bit "double-precision" subsection DA consisting of the 25th through 53rd most significant mantissa bits, and an 11-bit "extended-precision" section EA consisting of the 54th through 64th most significant (and thus the 11 least significant) mantissa bits. Matching register REGB analogously includes a sign section SNB, an exponent section EXB, and a mantissa section MNB, the latter including a "single-precision" subsection SB, a "double-precision" subsection DB, and an "extended-precision" subsection EB. The mantissa subsections are labeled to reflect their respective roles in indicating apparent precision.

Mode selector MS includes two logical adders LAE and LAD. Logical adder LAE is effectively a 23-bit OR gate. It has as its inputs 11 bits from extended-precision subsection EA, 11 bits from extended-precision subsection EB, and 1 bit from high-order requested precision input to floating-point processor FPP. The output of logical adder LAE is high when: 1) any bit of subsection EA is high, indicating that the apparent precision of mantissa MNA is "extended"; or 2) when any bit of subsection EB is high, indicating that the apparent precision of mantissa MNB is "extended"; or 3) when line PH is high, indicating that an extended precision floating-point result is being requested.

Logical adder LAD is effectively a 59-bit OR gate. It has as its inputs: the 29 bits of subsection DA, the 29 bits of subsection DB, and one bit from the low-order requested precision input D/S to floating-point processor FPP. The output of logical adder LAD is thus high when: 1) any bit of subsection DA is high, indicating that the apparent precision of mantissa MNA is not "single"; 2) any bit of subsection DB is high, indicating that the apparent precision of mantissa MNB is not "single"; or 3) the low-order requested precision input PL is high, indicating that the requested result precision is either "double" or "extended" but not "single". The output of logical adder LAD is low when all 59 bits are low, indicating that the greater of the apparent and requested precisions is not "double".

The outputs of logical adders LAE and LAD collectively define a two-bit output for mode selector MS, with the output of LAE being the higher order output bit. The two-bit output is decoded as follows: "11" and "10" indicate "extended precision", "01" indicates "double precision", and "00" indicates "single precision". This two-bit output causes execution unit EXU to perform at the precision corresponding to the maximum of the apparent precisions of mantissas MNA and MNB and the requested result precision input to processor FPP.

Execution unit EXU performs the operation requested at processor input OP at the precision selected by mode selector MS on operands OPA and OPB stored in registers REGA and REGB. The result, which is in extended-precision format, regardless of the precision implemented, is directed from output Q to result format converter FCR.

Result format converter FCR converts to the format indicated by its inputs E/E and D/S, which are respectively coupled to processor inputs PH and PL. If PH is high, "extended precision" was requested, the result is rounded to extended precision. If PH is low, the requested precision is indicated by processor input PL. Thus, if PH is low and PL is high (01), result format converter FCR converts to double-precision format, rounding the mantissa and adjusting the exponent as required. If PH is low and PL is low (00), result format converter FCR converts to single-precision format, again rounding the mantissa and adjusting the exponent. Format converter FCR can flag an error if the exponent is too large for the destination format. The result Z is identical to that which would have been obtained if the operation were performed in extended-precision and format converted.

Figure 2:
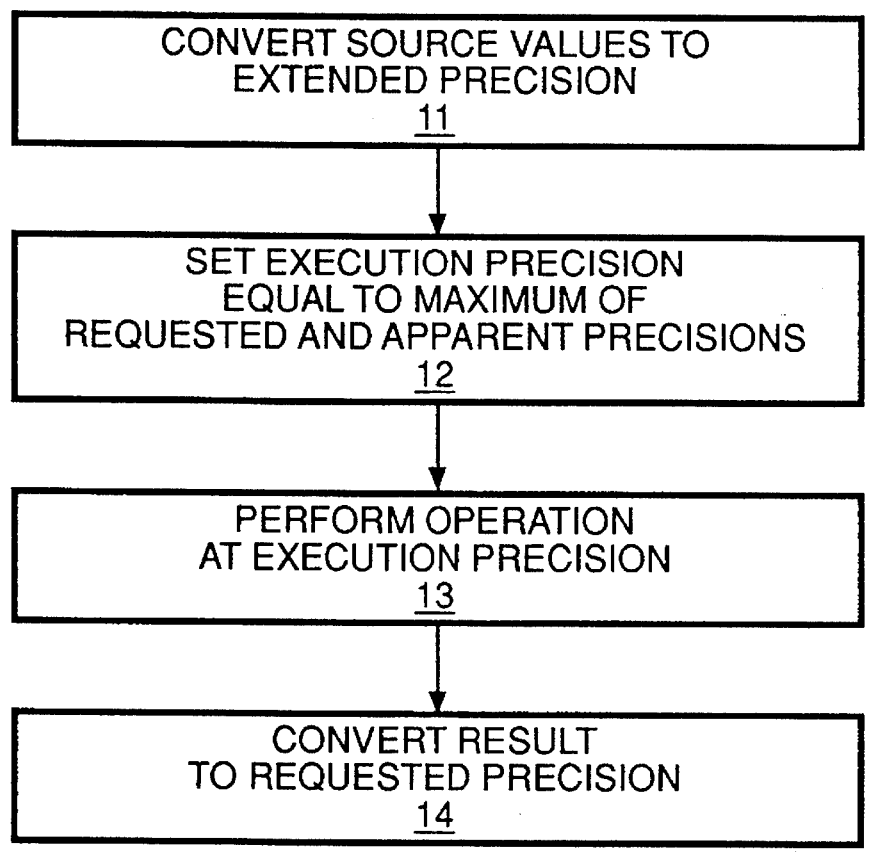
FIG. 2 is a flow chart of a method of the present invention used in conjunction with the processor of FIG. 1.

A method 10 as practiced in the context of floating-point processor FPP is flow-charted in FIG. 2. Given are source values, a requested operation, and a requested result precision. The source values are converted, as necessary, to extended precision at step 11 for storage in registers REGA and REGB. An execution precision is set at step 12 equal to the maximum off 1) the requested result precision, and 2) the maximum apparent precision of the operands. The requested operation is then executed at the execution precision at step 13, preferably with the mantissas truncated to the execution precision and the exponents remaining at extended precision. The extended precision result is then converted, as necessary, to the requested result precision, at step 14.

While the foregoing describes the preferred embodiment, the invention provides for the following variations and modifications. Operations are provided for in addition to or in place of multiplication and division. Some of these operations, such as square root and trigonometric functions require only one operand, while others, such as multiply-add, can require more than two operands. Accordingly, the number of source values ranges from one to two or more.

While the present invention is most applicable when there are at least two requestable precisions, the present invention provides for as few as one requested result precision. As long as the requested result precision is less than the maximum nonfinal operand precision, the invention affords reductions in latencies. The invention also provides for higher numbers of precisions. Furthermore, the precisions can be differentiated by as few as one bit.

In the preferred embodiment, the operands are stored in extended precision. Selecting a common operand precision simplifies determination of apparent precision. However, apparent precision can be determined even when different operand precisions are used. Accordingly, some embodiments of the present invention do not employ an input format converter. In general, sufficient registers are provided for storing all operands. A result register can be provided as well.

The present invention provides for considerable variation in the mode selector. In the preferred embodiment, the apparent precisions are not explicitly determined. In a major alternative embodiment, the mode selector scans each register independently to determine its apparent precision. The results are stored in a flag register. The contents of these flag registers are then compared to the requested result precision to determine the execution precision. The preferred mode selector scans only the mantissa, but exponents can be scanned and used in the selection of execution mode.

More sophisticated mode selection is also provided for. In general, the execution precision is at least as fine as the requested result precision. However, exceptions can be made to further reduce latencies. For example, when the sum of two apparent operand precisions measured in bits is less than or equal to 24 bits, a multiplication can be performed in single precision even where double or extended results are requested. In general, more complex scanning of the operands can identify more situations in which a low execution precision can be performed without affecting the result.

Note that there is no necessary correspondence between the precisions that can be requested and those that can be executed. For example, while requested precisions might be limited to three levels of precision, execution precision can be advantageously selected to the individual bit to maximize latency reduction. The tradeoff is that the complexity of the logic required to select the optimum precision at the bit level adds latencies of its own.

The preferred execution unit truncates mantissas to correspond to the execution precision, while leaving exponents in extended precision. Alternatively, both exponents and mantissas can be converted to the execution precision. Preferably, such an execution unit is used in conjunction with a mode selector that scans exponents as well as mantissas to determine apparent precision. Otherwise, the execution unit should flag exponent conversion errors.

The preferred embodiment provides results initially in extended precision format. Alternatively, the execution unit can be designed to provide results directly in the requested result precision. This approach makes the most sense in systems using a fixed result precision. In such cases, a result format converter is not required. These and other modifications to and variations upon the preferred embodiments are provided for by the present invention, the scope of which is limited only by the following claims.

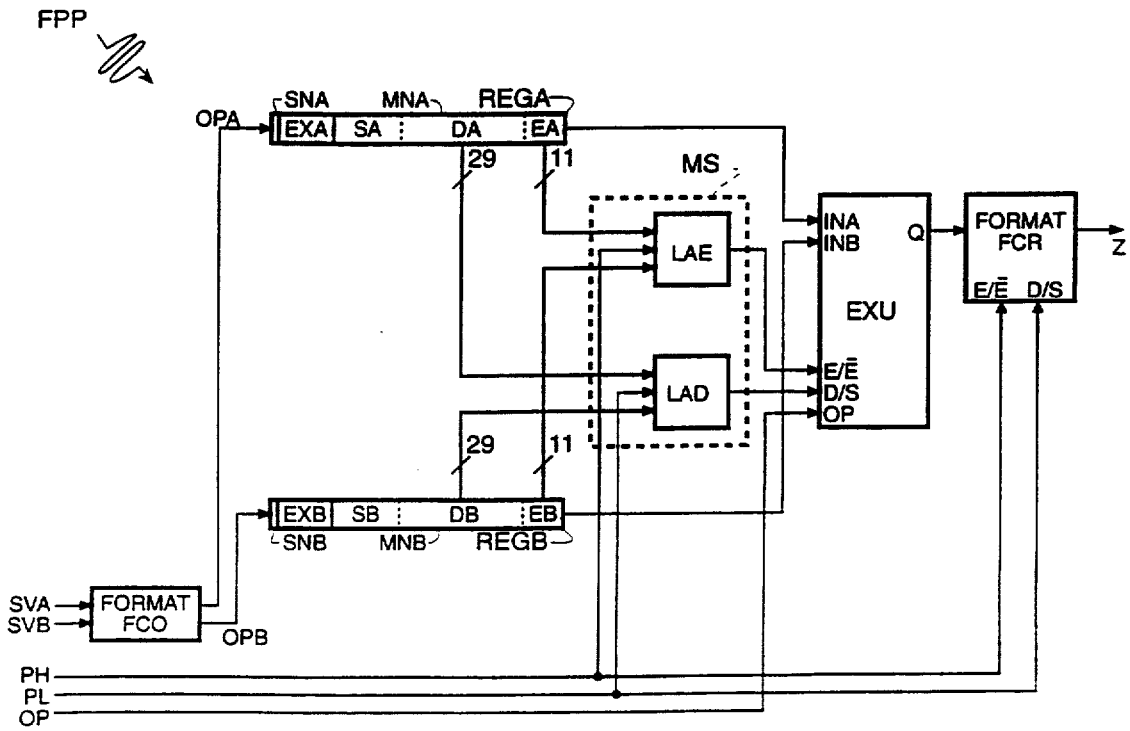

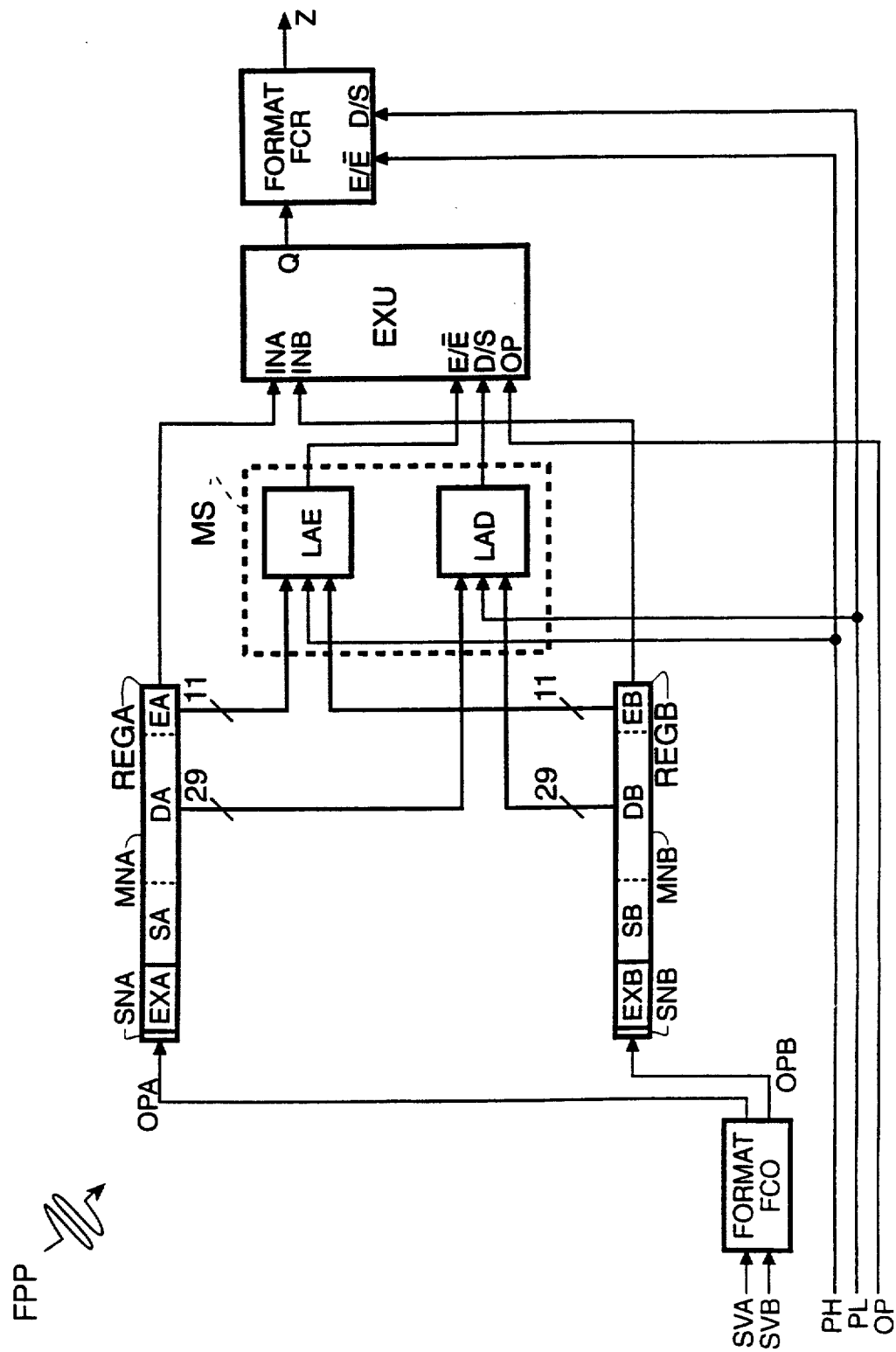

I claim:

1. A multi-precision floating-point processor for performing an operation on an operand set of operands and yielding the result in a requested result precision, said requested result precision being selected from a precision set of at least two precisions including a highest precision, each operand of said operand set having a nominal precision, each operand of said operand set having an exponent and a mantissa, each operand of said operand set having an apparent precision that is a function of its nominal precision and the number of trailing zeroes in its mantissa, said operand set having a maximum apparent precision equal to the maximum of the apparent precisions of said operands, said processor comprising:

input means for receiving an instruction specifying said operation and said requested result precision;

register means for storing said operand set;

node selector means for determining and selecting an execution precision equal to the maximum of said requested result precision and said maximum apparent precision; and execution means for performing said operation with said execution precision and providing a result of said operation in said requested result precision.

2. A multi-precision floating-point processor as recited in claim 1 wherein said execution means includes:

an execution unit for performing said operation with said execution precision so as to yield an execution result; and result format conversion means for, when said execution result is not in said requested result precision, converting said execution result to said requested result precision.

3. A multi-precision floating-point processor as recited in claim 2 wherein:

said requested result precision is selected from a precision set consisting of extended precision, double precision, and single precision; and said register means includes a register set of registers, each register of said register set including a respective exponent section and a respective mantissa section, each mantissa section including a single precision subsection, a double precision subsection, and an extended precision subsection.

4. A multi-precision floating-point processor as recited in claim 3 wherein said mode means includes:

a first logical adder for determining whether or not extended precision is either the requested result precision or the apparent precision of any operand, in which case said execution precision is extended; and a second logical adder for determining whether said requested result precision is not double and none of said operands has an apparent double precision, in which case said execution precision is single if it is not extended, otherwise said execution precision is double if it is not extended.

5. A floating-point computer method for performing a requested operation on an operand set of operands to achieve a result, said method comprising:

determining the maximum precision of a requested result precision and the maximum apparent precision of said operand set;

using a digital execution unit to perform said operation type at said maximum precision to obtain a result having an execution result precision; and if said execution result precision is greater than said requested result precision, converting the precision of said result to said requested result precision.

6. A method as recited in claim 5 further comprising converting received source values to said operands by converting the formats of any of said source values having a format less than said highest precision to said highest precision format.

7. A method as recited in claim 6 wherein said result precision is selected from the set consisting of extended precision, double precision, and single precision.

* * * * *

UNITED STATES PATENT AND TRADEMARK OFFICE
CERTIFICATE OF CORRECTION

PATENT NO. : 5,481,686
DATED : January 2, 1996
INVENTOR(S) : Kenneth A. Dockser

It is certified that error appears in the above-indentified patent and that said Letters Patent is hereby corrected as shown below:

The title page, should be deleted to appear as per attached title page.

The sheet of drawing consisting of figure 1, should be deleted to appear as per attached sheet.

Signed and Sealed this

Thirty-first Day of December, 1996

*Attest:*

BRUCE LEHMAN

*Attesting Officer*     *Commissioner of Patents and Trademarks*

United States Patent [19]

Dockser

[11] Patent Number: 5,481,686
[45] Date of Patent: Jan. 2, 1996

[54] FLOATING-POINT PROCESSOR WITH APPARENT-PRECISION BASED SELECTION OF EXECUTION-PRECISION

[75] Inventor: Kenneth A. Dockser, San Jose, Calif.

[73] Assignee: VLSI Technology, Inc., San Jose, Calif.

[21] Appl. No.: 433,829

[22] Filed: May 4, 1995

Related U.S. Application Data

[63] Continuation of Ser. No. 241,108, May 11, 1994, abandoned.

[51] Int. Cl.$^6$ ................................................. G06F 9/302
[52] U.S. Cl. .................. 395/375; 364/937.1; 364/258.0
[58] Field of Search ............................ 395/375, 800; 364/748

[56] References Cited

U.S. PATENT DOCUMENTS

| | | | |
|---|---|---|---|
| 4,484,259 | 11/1984 | Palmer | 364/754 |
| 5,027,272 | 6/1991 | Samuels | 395/375 |

OTHER PUBLICATIONS

"IEEE Standard for Binary Floating-Point Arithmetic," ANSI/IEEE Std 754-1985, published by the Institute of Electrical and Electronics Engineers, Inc., N.Y. 1985

*Primary Examiner*—David Y. Eng
*Attorney, Agent, or Firm*—Clifton L. Anderson

[57] ABSTRACT

A floating-point processor comprises an input format converter, operand registers, a mode selector, an execution unit, and a result format converter. Inputs to the processor include first and second source values, low and high order result precision selectors, and an operation selector. The input format converter converts the source values to extended precision operands for storage in the registers. The mode selector is responsive to the apparent precisions, i.e., the numbers of trailing zeroes in the mantissas, of the operands as well as to the requested precision. The maximum of the requested result precision and the apparent precision determines the precision implemented by the execution unit. The results are stored in extended precision regardless of the execution precision. If the requested precision is less than extended, the result format converter converts the result to the requested format.

7 Claims, 2 Drawing Sheets